(12) United States Patent
Knies et al.

(10) Patent No.: US 8,883,111 B2
(45) Date of Patent: Nov. 11, 2014

(54) METHOD FOR PRODUCING NEOPENTASILANES

(75) Inventors: Wolfgang Knies, Burghausen (DE); Hans Eiblmeier, Burghausen (DE)

(73) Assignee: Wacker Chemie AG, Munich (DE)

( * ) Notice: Subject to any disclaimer, the term of this patent is extended or adjusted under 35 U.S.C. 154(b) by 290 days.

(21) Appl. No.: 13/062,868

(22) PCT Filed: Oct. 9, 2009

(86) PCT No.: PCT/EP2009/063136
§ 371 (c)(1),
(2), (4) Date: Mar. 8, 2011

(87) PCT Pub. No.: WO2010/043551
PCT Pub. Date: Apr. 22, 2010

(65) Prior Publication Data
US 2011/0171098 A1 Jul. 14, 2011

(30) Foreign Application Priority Data
Oct. 17, 2008 (DE) .......................... 10 2008 042 934

(51) Int. Cl.
*C01B 33/04* (2006.01)
*C01B 33/08* (2006.01)
*C01B 33/107* (2006.01)

(52) U.S. Cl.
CPC .............. *C01B 33/04* (2013.01); *C01B 33/107* (2013.01)
USPC ........................... 423/341; 423/342; 423/347

(58) Field of Classification Search
CPC ........ C01B 33/04; C01B 33/08; C01B 33/107
USPC .......................................... 423/341, 342, 347
See application file for complete search history.

(56) References Cited

U.S. PATENT DOCUMENTS

| 4,610,859 A | 9/1986 | Miyagawa et al. |
| 4,639,361 A * | 1/1987 | Aono et al. .................... 423/347 |
| 2006/0135773 A1* | 6/2006 | Semple et al. .................. 546/22 |
| 2010/0176338 A1* | 7/2010 | Cannady et al. ........... 252/182.3 |
| 2011/0284796 A1* | 11/2011 | Auner et al. ............. 252/182.32 |

FOREIGN PATENT DOCUMENTS

| EP | 0149363 A2 | 7/1985 |
| EP | 0149363 A3 | 7/1985 |
| JP | 61091011 A | 5/1986 |
| WO | WO 2008/051328 A1 | 5/2008 |

OTHER PUBLICATIONS

Höfler et al., "Zur Kenntnis Des Neopentasilans", Inorg. Nucl. Chem. Letters, vol. 9, pp. 723-725 (1973).
Kaczmarczyk et al., "The Preparation and Some Properties of a New Pentasilicon Dodecachloride, $Si_5Cl_{12}^{(1)}$", J. Inorg. Nucl. Chem., vol. 26, pp. 421-425 (1964).
Urry, "Recent Developments in the Chemistry of Perchloropolysilanes A General Summary", J. Inorg. Nucl. Chem., vol. 26, pp. 409-414 (1964).
International Search Report for PCT/EP2009/063136 dated Mar. 31, 2010.
PatBase Abstract for JP61091011A (1986).

* cited by examiner

*Primary Examiner* — Ncoc-Yen Nguyen
(74) *Attorney, Agent, or Firm* — Caesar, Rivise, Bernstein, Cohen & Pokotilow, Ltd.

(57) ABSTRACT

The invention relates to a method for producing neopentasilanes of the general formula (1) $Si(SiR_3)_4$ (1), wherein silicon compounds of the general formula (2) $R_3Si$—$(Si$—$)_xSiR_3$ (2), wherein R is selected from H, Cl, Br, and I and x stands for a nonnegative integer up to 5, are reacted in the presence of ether compounds (E).

4 Claims, No Drawings

METHOD FOR PRODUCING NEOPENTASILANES

BACKGROUND OF THE INVENTION

The invention relates to a process for preparing neopentasilanes from polysilanes in the presence of ether compounds.

Neopentasilanes (tetrakis(silyl)silanes) are used for the deposition of Si—C in CVD processes.

The preparation of neopentasilanes is described in WO 2008051328. There, hexahalodisilane is reacted with tertiary amines as catalysts to form mixtures comprising tetrakis(trihalosilyl)silane. The tetrakis (trihalosilyl)silane is reduced with diisobutyl aluminumhydride to form tetrakis(silyl)silane.

The process has the disadvantage that tertiary amines are frequently corrosive and must therefore be handled with care. Moreover, traces of nitrogen affect the semiconducting properties of silicon, and many applications therefore specify the nitrogen content.

SUMMARY OF THE INVENTION

The invention provides a process for preparing neopentasilanes of the general formula (1)

$$Si(SiR_3)_4 \quad (1)$$

in which silicon compounds of the general formula (2)

$$R_3Si-SiR_3 \quad (2),$$

where R is selected from H, Cl, Br, and I, are reacted in the presence of ether compounds (E).

DETAILED DESCRIPTION OF PREFERRED EMBODIMENTS

Ether compounds (E) are readily accessible chemicals which are easily separated off.

Preferred ether compounds (E) are cyclic organic ether compounds which have preferably at least 5 ring atoms and preferably not more than 30 ring atoms, such as 1,3-dioxolane, tetrahydrofuran, tetrahydropyran, tetrahydropyran, 1,4-dioxane, [12]crown-4, [15]crown-5. The cyclic ether compounds (E) may have hydrocarbon substituents, more particularly alkyl radicals having 1 to 6 carbon atoms, preferably methyl and ethyl. Examples of substituted cyclic ether compounds (E) are 4-methyl-1,3-dioxolane, 3-methyltetrahydrofuran, and 2,2-dimethyl-1,4-dioxane.

Likewise preferred are linear or branched organic ether compounds (E), such as monoethers and polyethers. Preferred monoethers are ethers having a boiling point of at least 60° C. at 1 bar, an example being di-n-propyl ether.

As polyethers it is also possible to use polyalkylene glycols, such as polyethylene glycol and polypropylene glycol. The average molar masses Mn of the polyalkylene glycols are preferably at least 150, more particularly at least 500, and preferably not more than 10 000, more particularly not more than 5000.

The neopentasilane of the general formula (1) may have identical or different definitions of R in one molecule. Preferably all R have identical definitions. Particularly preferred are the definitions H and Cl.

The reaction takes place preferably at at least −5° C., more preferably at at least 50° C., and more particularly at at least 100° C., and preferably at not more than 300° C., more particularly at not more than 250° C.

The reaction is carried out preferably for at least 1 hour, more preferably for at least 3 hours, and more particularly for at least 10 hours, and preferably for not more than 10 days.

Per 100 parts by weight of silicon compound of the general formula (2), use is made preferably of at least 0.1, more preferably at least 0.5, and more particularly at least 2 parts by weight of ether compounds (E), and preferably not more than 50, more preferably not more than 20, and more particularly not more than 10 parts by weight of ether compounds (E).

After the reaction, the reaction mixture is separated preferably by distillation. This can be done alternatively under atmospheric pressure, superatmospheric pressure or reduced pressure.

The reaction can be carried out in the presence or absence of inert gas, such as nitrogen, helium or argon; alternatively it may be carried out in air, as long as the moisture content is not more than 10 ppbw. For reasons of cost, the distillation is carried out preferably in the presence of nitrogen.

Unless indicated otherwise, the examples below are carried out at a pressure of the surrounding atmosphere, in other words approximately at 1000 hPa, and at room temperature, in other words at approximately 23° C., and also with a relative atmospheric humidity of approximately 50%.

In the examples below, the level of impurities was determined by gas chromatography.

Example 1

A nitrogen-blanketed three-neck flask with thermocouple, reflux condenser, and stopper was charged with 127 g of hexachlorodisilane and 10 g of tetrahydrofuran, and this initial charge was heated to boiling with stirring. At approximately 100° C., the formation of a condensate was already observed on the condenser, despite the fact that hexachlorodisilane boils only at 154° C. With increasing duration, the temperature required for formation of a condensate fell further, to approximately 70° C. After 7 hours, the heating was shut off. The reaction mixture, which initially was highly mobile, cooled to 30° C. At this temperature, the mixture suddenly became turbid, and the temperature rose again, without external heating, to approximately 35° C. A crystalline solid was formed, but the mixture could still be stirred easily.

On the next day, the resultant solid was separated from the supernatant solution and characterized by Si29-NMR. The signals of tetrachlorosilane and dodecachloroneopentasilane were observed.

Example 2

Subsequently, different mixtures of THF (1 g) and hexachlorodisilanes (10 g) were stored at room temperature for several days. Again, in addition to unreacted hexachlorodisilane, tetrachlorosilane and dodecachloroneopentasilane were formed. (Detection via Si29)

Example 3

In this experiment, approximately 5 g of hexachlorodisilane and approximately 1 g of catalyst were introduced into a steel tube screwed shut at both ends, and heated to 170° C. in an oil bath.

The catalysts investigated were
15-crown-5 98%, 1,4,10,13-pentaossacidopentadecano (crown ether)
silicone oil AK20 (not inventive)
THF
1,4-dioxane All of the substances caused the formation of a complex mixture of tetrachlorosilane, octachlorotrisilane, decachloroisopentasilane, and dodecachloroneopentasilane. In the case of the silicone oil, however, the decomposition occurred only to a small extent. A pure hexachlorodisilane, as a reference, remained undecomposed, even at a temperature of 210° C./24 hours.

Example 4

In an argon-blanketed flask equipped with thermometer, reflux condenser, and magnetic stirrer, 106 g of hexachlorodisilane and 10 g of tetrahydrofuran were introduced. The mixture was heated at reflux for 5 hours and then cooled. This time, at 26° C., again there was an exothermic reaction (temperature increase by approximately 4° C.). On the next day, again, the mixture was boiled at reflux for 5 hours, and again, on cooling, at 26° C. there was an increase in temperature by 4° C. From this it was concluded that the crystallization of the adduct of tetrachlorosilane and dodecachloroneopentasilane liberates heat. After cooling, colorless crystals had formed in each case, and were isolated by filtration in a glove box and washed with tetrachlorosilane. This gave approximately 32 g of solid.

The Si29 NMR confirmed that this was the adduct. In the thermogravimetry, two stages were observed, one at approximately 80° C. (elimination of the tetrachlorosilane) and at approximately 280° C. (evaporation of the dodecachloroneopentasilane). In the DSC, two signals are apparent, at 54° C. (evaporation of excess tetrachlorosilane) and at 74° C. (elimination of the tetrachlorosilane from the adduct). The evaporation taking place at approximately 290° C. is replaced by an exothermic reaction. This is in agreement with the gravimetry, in which a nonevaporable residue of approximately 14% remained.

Example 5

Investigation of the dependence of the decomposition of hexachlorodisilane on the amount of tetrahydrofuran The investigations were carried out in the steel tube as described in example 3 at 210° C./3 days. The mixtures were also stored at room temperature for the same time.

9.3% THF: formation of a mixture of oligochlorosilanes analogously to example 3 and solid.
5.1% THF: ditto
1% THF: ditto
0.5% THF: ditto
0.25% THF: ditto
470 ppm THF: traces of decomposition
240 ppm THF: traces of decomposition Example 6

The investigations were carried out in the steel tube as described in example 3 at 100 or 150° C. for 1.3 days.

At 100° C., 0.1% THF is sufficient for the decomposition to commence. Even with small additions of THF, the formation of the solid dodecachloroneopentasilane is observed.

The invention claimed is:

1. A process for preparing a neopentasilane of the general formula (1)

$$Si(SiR_3)_4 \qquad (1),$$

said process consisting of providing a catalyst consisting of an ether compound and decomposing in a presence of the catalyst silicon compounds of the general formula (2)

$$R_3Si-SiR_3 \qquad (2)$$

where each R is identical or different and selected from the group consisting of H, Cl, Br, and I, to form the neopentasilane of the general formula (1).

2. The process as claimed in claim 1, wherein the ether compound is a cyclic organic ether having at least 5 ring atoms and not more than 30 ring atoms.

3. The process as claimed in claim 1, wherein the neopentasilane has identical definitions of R, which is a member selected from the group consisting of H and Cl, in one molecule.

4. The process as claimed in claim 1, wherein per 100 parts by weight of the silicon compounds of the general formula (2) use is made of at least 0.2 part by weight of the ether compound.

* * * * *